Feb. 26, 1924.
S. L. MARSH
INTERCEPTOR
Filed Jan. 6, 1923
1,484,953
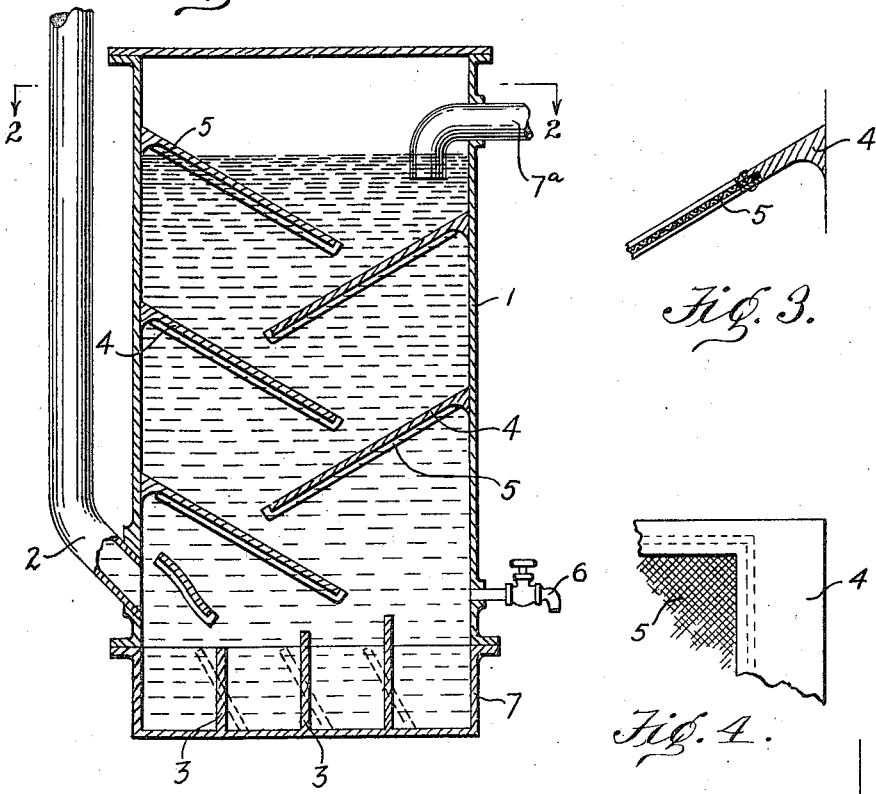
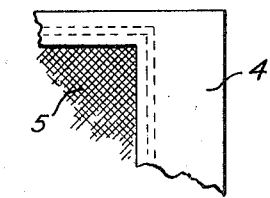
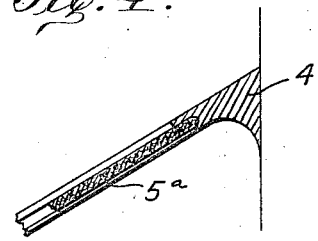
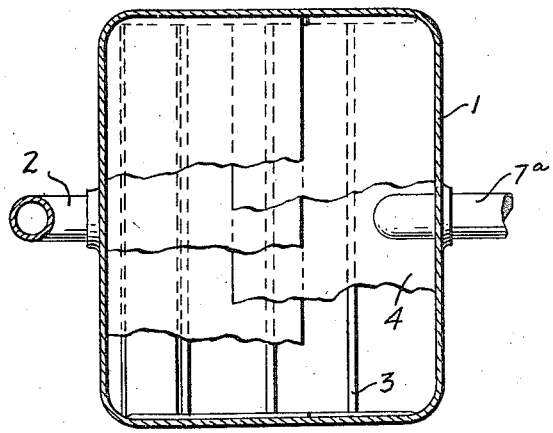
Inventor
Samuel L. Marsh
By his Attorney Patented Feb. 26, 1924.

1,484,953

UNITED STATES PATENT OFFICE.

SAMUEL L. MARSH, OF LOS ANGELES, CALIFORNIA.

INTERCEPTOR.

Application filed January 6, 1923. Serial No. 611,084.

*To all whom it may concern:*

Be it known that I, SAMUEL L. MARSH, a citizen of the United States, residing at Los Angeles, California, have invented certain new and useful Improvements in Interceptors, of which the following is a specification.

My present invention relates to a trap through which fluids are adapted to pass in order to remove therefrom any solid matter.

One object of my invention is the provision of a receptacle through which drainage water will pass, for the removal of solid foreign matter in mass, or a small state of subdivision.

Another object is the provision in the above device of means whereby such solid matter may be completely and readily removed.

To this end my invention includes a trap or similar receptacle having a fluid entrance near its bottom, the bottom and sides of said trap being provided with baffles so that the water or other fluid will be forced to flow in a circuitous path in order to reach the outlet located near the top of the trap. Some of the baffles may, or may not, contain screens, as desired.

The drawings illustrate one embodiment of the principle involved, but it is understood that I do not limit myself to this form only.

In the drawing:—

Figure 1 is a sectional elevation of such a device.

Fig. 2 is a plan view partly in section.

Figs. 3, 4 and 5 are details of the screen and baffle.

The trap proper is illustrated at 1 and may be of any desired shape, shown rectangular for convenience, and having a fluid inlet 2 near the bottom thereof. Baffles 3 may be affixed vertically to the bottom of the trap or inclined, as at 3ª in dotted lines. Side wall baffles 4 angularly disposed in relation to said walls, are provided in a manner that their ends overlap but do not touch. As many of these parts may be used as found expedient. It may be found desirable to provide the baffles 4 with screens 5, or filter felts 5ª, which may either be inserted or slipped into slots in the baffle body 4. A valved outlet may be desirable, as at 6, and in some instances the entire bottom 7 may be made removable.

The water or other fluid laden with dirt, or other particles, enters at 2, the heavier foreign matter settling in one of the pockets formed by baffles 3. From here the partially cleansed fluid passes in a circuitous path upward around and between and through baffles 4, the latter being true if screens or filter felts, or mediums are used. By the time the fluid reaches the outlet 7ª, it is in a high state of purity and all or substantially all of the foreign matter is removed. The screens or filter felts may be readily removed from their baffles for cleaning or replacement, as desired. The baffles may be of uniform length or varied according to circumstances.

What is claimed is:—

1. An interceptor adapted to separate a solid from a liquid, including a casing, a fluid inlet near the bottom thereof, and an outlet near its top, baffles located at the bottom of said casing and in angular relation to the incoming stream of mixed solids and liquid, whereby the heavier particles in said fluid are carried by their momentum into the pockets formed by said baffles, the stream of fluid passing upward away from said baffles, and means entirely above said baffles for removing the remaining particles from said stream including a plurality of screens projecting from opposite sides of said casing, each screen extending only part way across said casing.

2. An interceptor adapted to separate a solid from a liquid including a casing formed into a main and a bottom part, a fluid inlet near the junction of the bottom part with the main part, and an outlet near the top of the main part, baffles located in the bottom of the bottom part and in angular relation to the incoming stream of mixed solids and liquid whereby the heavier particles in said fluid are carried by their momentum into pockets formed between said baffles, the stream of fluid passing upward away from said baffles, said bottom part bearing the said baffles being removable from said main part, and means entirely above said baffles for removing the remaining particles from said stream.

In testimony whereof I have affixed my signature to this specification.

SAMUEL L. MARSH.